United States Patent
Lubbers et al.

(10) Patent No.: US 7,441,097 B2
(45) Date of Patent: Oct. 21, 2008

(54) DATA STORAGE SYSTEM AND METHOD FOR ADAPTIVE RECONSTRUCTION OF A DIRECTORY STRUCTURE

(75) Inventors: Clark Edward Lubbers, Colorado Springs, CO (US); Randy L. Roberson, New Port Richey, FL (US)

(73) Assignee: Seagate Technology LLC, Scotts Valley, CA (US)

( * ) Notice: Subject to any disclaimer, the term of this patent is extended or adjusted under 35 U.S.C. 154(b) by 706 days.

(21) Appl. No.: 10/658,982

(22) Filed: Sep. 10, 2003

(65) Prior Publication Data

US 2005/0055529 A1    Mar. 10, 2005

(51) Int. Cl.
G06F 12/06 (2006.01)

(52) U.S. Cl. .................. 711/207; 711/221; 707/101

(58) Field of Classification Search .......... None
See application file for complete search history.

(56) References Cited

U.S. PATENT DOCUMENTS

| | | | |
|---|---|---|---|
| 4,827,462 A | 5/1989 | Flannagan et al. | |
| 5,359,724 A | 10/1994 | Earle | |
| 5,566,328 A | 10/1996 | Eastep | |
| 5,659,739 A | 8/1997 | Lubbers et al. | |
| 5,671,406 A * | 9/1997 | Lubbers et al. | 707/7 |
| 5,692,147 A | 11/1997 | Larsen et al. | |
| 5,710,907 A | 1/1998 | Hagersten et al. | |
| 5,761,501 A | 6/1998 | Lubbers et al. | |
| 5,832,526 A | 11/1998 | Schuyler | |
| 5,893,144 A | 4/1999 | Wood et al. | |
| 5,926,829 A | 7/1999 | Hagersten et al. | |
| 5,933,592 A | 8/1999 | Lubbers et al. | |
| 5,956,723 A | 9/1999 | Zhu | |
| 6,117,185 A | 9/2000 | Schmidt | |
| 6,151,685 A * | 11/2000 | Li et al. | 714/6 |
| 6,173,291 B1 | 1/2001 | Jenevein | |
| 6,356,897 B1 | 3/2002 | Gusack | |
| 6,445,680 B1 | 9/2002 | Moyal | |
| 6,505,283 B1 * | 1/2003 | Stoney | 711/170 |
| 6,745,189 B2 | 6/2004 | Schreiber | |
| 6,789,156 B1 | 9/2004 | Waldspurger | |
| 6,895,467 B2 | 5/2005 | Lubbers et al. | |
| 2003/0079102 A1 | 4/2003 | Lubbers et al. | |
| 2004/0059876 A1* | 3/2004 | Nanda et al. | 711/141 |
| 2004/0221120 A1* | 11/2004 | Abrashkevich et al. | 711/170 |
| 2005/0055529 A1 | 3/2005 | Lubbers et al. | |

FOREIGN PATENT DOCUMENTS

JP    2004-038928 A2    2/2004

* cited by examiner

*Primary Examiner*—B. James Peikari
(74) *Attorney, Agent, or Firm*—Fellers, Snider, et al.

(57) ABSTRACT

A directory structure for a sparsely filled data container comprises a linked list, doubly linked list, skip list, or other non-fully populated list technique. One or more hierarchical levels of such lists may be used for sparsely filled directories. The directory structure may be converted to a conventional look-up table directory by reconstructing the directory when the directory becomes populated to certain point.

22 Claims, 5 Drawing Sheets

US 7,441,097 B2

DATA STORAGE SYSTEM AND METHOD FOR ADAPTIVE RECONSTRUCTION OF A DIRECTORY STRUCTURE

FIELD OF THE INVENTION

The present invention pertains to computer memory storage systems and specifically to computer memory storage systems having large virtual storage.

BACKGROUND OF THE INVENTION

Data storage systems can contain a directory that points to the location of information contained within the data storage system. The directory may be searched to find the location of a particular file, and then the address contained in the directory may be used to retrieve the requested file. As items are stored in the data storage system, entries are created in the directory for those items.

The storage device referenced by the directory may be a single disk drive or may be an organized conglomerate of several disk drives. Various methods exist to organize several disk drives, such as the various permutations of RAID technology. In some cases, the physical storage space may be smaller than the addressable memory of the directory. Such a case may be a sparsely filled database or virtual storage.

The directory information may be stored in random access memory so that the directory may be immediately searched in order to locate a particular file. As such, the size of the directory is preferred to be as small as reasonably possible. Further, the structure of the information should be amenable to quick searching.

The design of an optimum directory structure for sparsely filled and non-sparsely filled data containers may be different. In a fully populated directory, the directory may contain an entry for every block of data. Such a directory may consist of a large look-up table or other structure. In a sparsely filled directory, a look-up table may be very inefficient and consume a large amount of space in proportion to the actual amount of data stored in the container.

It would therefore be advantageous to provide a directory structure that is compact and easily searchable for sparsely filled directories yet may also be adapted to efficient searching as the directory becomes filled.

SUMMARY OF THE INVENTION

Embodiments of the present invention overcome the disadvantages and limitations of previous solutions by providing a system and method for providing a directory for a data storage container having one or more non-fully populated lists for sparsely filled directories. As the directory becomes more populated, the directory structure may be converted to a conventional look-up table. The directory structure may comprise a top level map that refers to a series of second level maps wherein the second level maps may be an ordered list map, skip list, linked list, doubly linked list, or other non-fully populated list mechanism.

An embodiment of the present invention relates to a new and useful manner for a computer file directory system wherein the directory structure may be changed from a structure suited for a sparsely populated directory to a structure suited for a fully populated directory. For the sparsely filled directory, at least a portion of the directory structure may comprise a linked list, a doubly linked list, skip list, or the like. Such a directory structure occupies much less memory than does a conventional directory structure. The sparsely filled directory structure may be reconfigured to a conventional, fully populated directory structure by reconstructing the directory when the directory reaches a certain capacity level.

The present invention includes sparsely filled directories that may be created that are substantially smaller in size and more easily traversed than conventional directories. Further, when the sparsely filled directory structures become, for example, less efficient than conventional look-up table directories, the directory may be reconstructed into a conventional look-up table. Thus, the appropriate directory structure may be used when it is most efficient.

These and various other features as well as advantages which characterize the present invention will be apparent upon reading the following detailed description and review of the associated drawings.

DETAILED DESCRIPTION OF THE INVENTION

Figure 1:
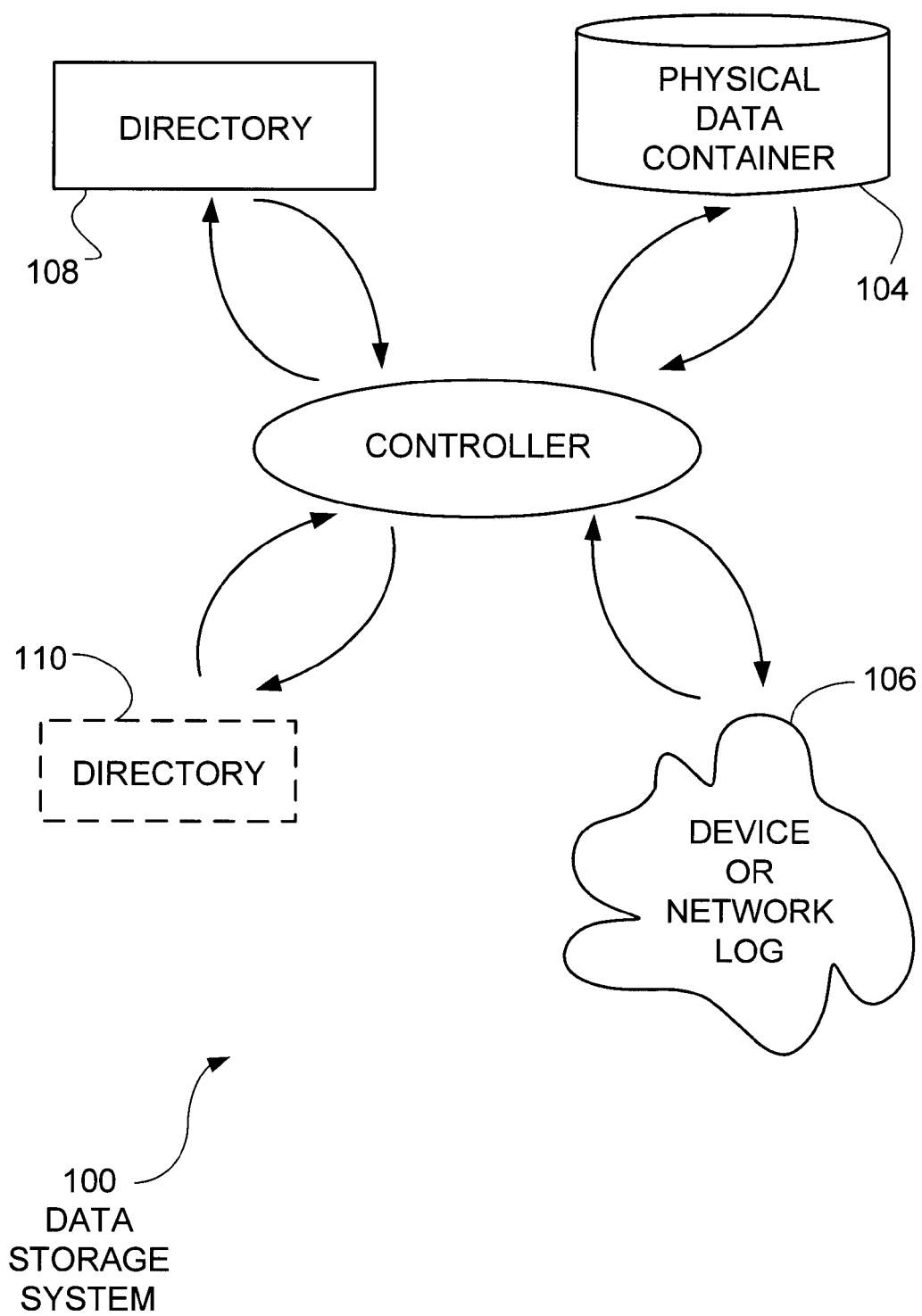
FIG. 1 is an illustration of an embodiment of the present invention of a data storage system.

FIG. 1 illustrates an embodiment 100 of the present invention of a data storage system. A controller 102 is connected to a physical data container 104 and is operative to pass data to and from a device or network 106. The controller may use one or more directories 108 and 110 to determine the location of information in the data container 104.

The data container 104 may be any type of read/write or read only data storage medium. For example, the data container 104 may be a single disk drive or an array of disk drives such as a RAID array. While the typical application may be a disk array, the data container 104 may also be other data storage mechanisms such as flash memory or random access memory. In some cases, the data container 104 may be a virtual data container.

The controller 102 is adapted to receive and process data storage and retrieval requests from the device 106. In some embodiments, the controller 102 may be a stand alone dedicated data storage controller connected to the device 106 which may be a central processing unit for a computer such as a server. In other embodiments, the functionality of the controller 102 may be implemented in software running on the central processing unit of a computer.

The directory 108 may map the data contained in the data container 104. The controller 102 may search the directory 108 in order to find a link to a specific file. The link may be the specific physical sector location on a disk drive or may be another type of link that directs the controller 102 to the actual location of the requested file. For example, the directory 108 may have entries that refer to a logical location on a disk array. The controller 102 may then translate the logical location to a specific physical location in order to access the data.

In some cases, a directory 110 may be created that may refer to a sparsely filled data container. An example of a sparsely filled directory may be a snapshot directory. A snapshot directory may be created when the state of a data container is to be saved at a particular point in time. For example, in order to save the state of the data container at the end of the week, the directory in use may be frozen and renamed as a backup or snapshot directory. A new, sparse directory may be created that will be used to store the incrementally changed files. In other words, when a file is changed, a new version of the file may be stored separately from the older version and the new file may be stored in the sparse directory. In this example, the sparse directory may only contain one entry yet the sparse directory may refer to and thereby map a very large data space.

A fully populated directory may be structured to have an entry for every single data block of the data space. Such a directory may include entries that contain the file name or other identifier for the data. The directory may be searched using various search techniques to locate the requested file. Because the directory contains a dedicated space for each data block of the data space, a fully populated directory has a fixed size. For a sparsely filled data container, a fully populated directory may be inefficient, especially for very large data containers.

The controller 102 may be capable of creating a sparse directory structure for sparsely filled data containers. A sparse directory structure may be formed from one or more linked lists, doubly linked lists, skip lists, hash lists, binary search trees, or other sparsely filled list techniques. The size of the sparse directory may be substantially less than a fully populated directory structure when the data container is sparsely populated. As the number of data entries increase, the sparse directory structure may become less efficient in terms of the amount of memory that must be dedicated to the directory as well as other factors.

The controller 102 may be capable of converting a directory created using the sparse directory structure into a fully populated directory structure when the amount of data in the directory increases past a certain level, for example. Further, the controller 102 may be capable of converting a directory created using a fully populated directory structure into a sparsely filled directory structure if such a change is warranted.

Figure 2:
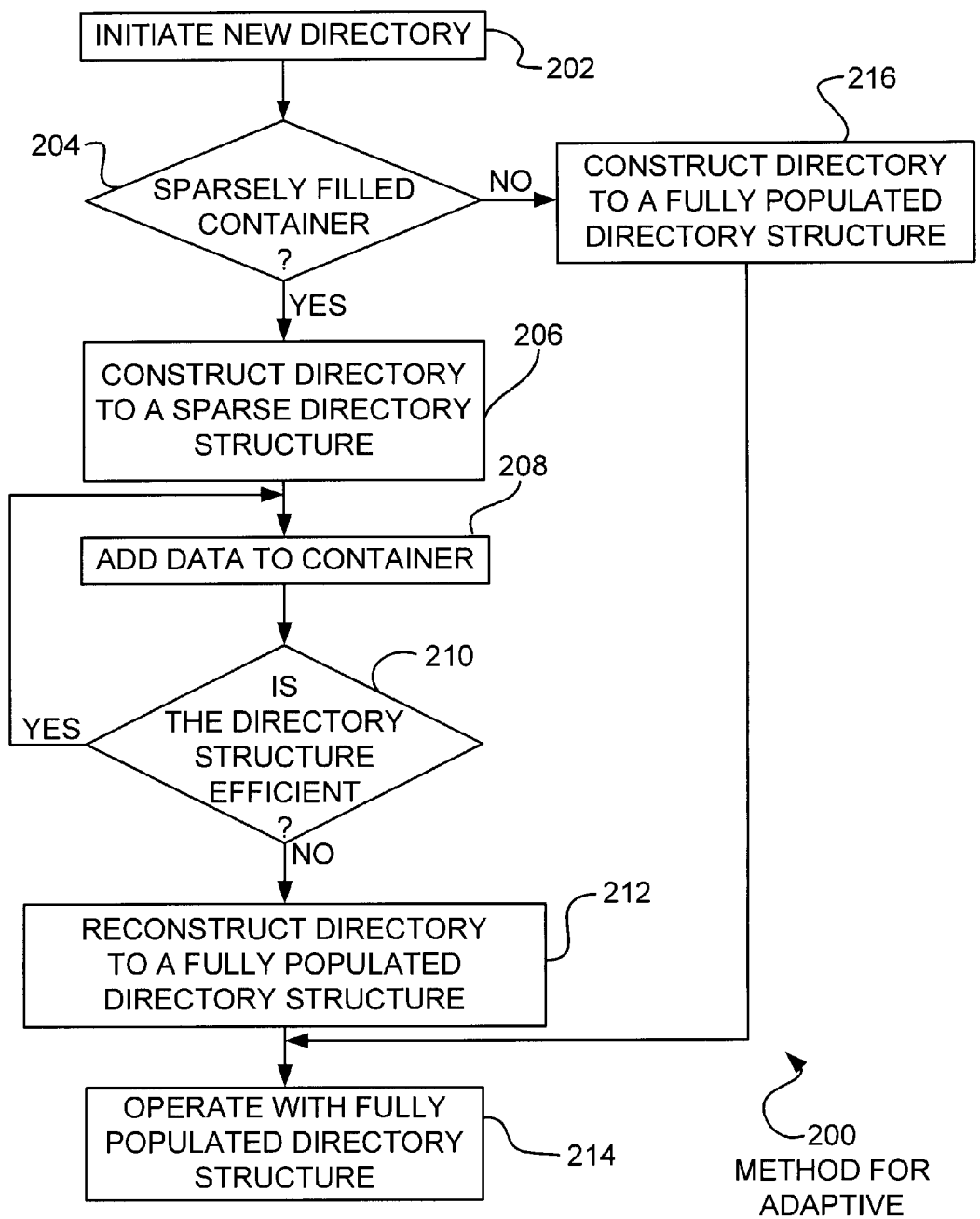
FIG. 2 is an illustration of an embodiment of the present invention of a method for adapting directory structures.

FIG. 2 illustrates an embodiment 200 of a method for adapting directory structures. A new directory is initiated in block 202. If the directory is for a sparsely filled container in block 204, the directory structure is configured for a sparsely filled container in block 206. Data is added to the container in block 208. If the directory structure is efficient in block 210, more data may be added in block 208. If the directory structure is not efficient in block 210, the directory structure is reconstructed into a structure more suited to a fully populated directory structure in block 212. The directory is operated with the fully populated directory structure in block 214. If the initial directory is not for a sparsely filled container in block 204, the directory may be configured with a fully populated directory structure in block 216 and operated in block 214.

The initiation of a new directory in block 202 may be when a new logical disk is created. The logical disk may create a data space that is available to a device for storing and retrieving data. The logical disk may map to a physical disk space on a single disk drive, an array of disk drives, or any other storage medium.

The directory that is to be created is evaluated as to whether or not it refers to a sparsely filled container in block 204. Several mechanisms may be used to make this determination. When the directory is created, an optional flag or indicator may be used to indicate that the directory will be a sparsely filled container. In another embodiment, an analysis is performed of the data space to determine if the directory would be better suited to a sparsely filled or fully populated structure.

The configuration of the directory as a sparsely filled structure is performed in block 206. A sparsely filled directory structure may be a searchable list-type structure. The list structure may be a linked list, a doubly linked list, a skip list, hash table, red-black tree, a binary search tree, or other structure that does not require a dedicated memory space for each storage block referenced in the data container. Those skilled in the arts may devise various non-fully populated searchable storage structures while keeping within the spirit and intent of the present invention.

The efficiency of the directory structure is analyzed in block 210 to determine if a change in the directory structure is necessary. A sparsely populated directory structure may become less efficient as more and more data is added to the directory. At some point, the fully populated directory structure becomes more desirable as the number of entries in the directory increases.

The decision to change directory structures in block 210 may be made once a predetermined number of entries is made in the directory or by other factors. For example, the decision to change directory structures may be made by a human operator that may have knowledge about the eventual uses of the directory. In the example, the operator may realize that the directory may soon be required to store a large amount of data and therefore the operator may cause the data structure to be changed. In some embodiments, the performance of the directory lookups may be monitored and evaluated for trends. In such embodiments, the controller may automatically analyze the performance to determine if and when the data structure should be changed.

The data structure of the directory may be reconstructed in block 212. The process for changing from a first directory structure to a second directory structure is dependent on the various structures. As those skilled in the arts would appreciate, various mechanisms and techniques may be used to convert the directory structure.

In another embodiment, the directory structure of a directory may be changed from a fully populated directory structure to a sparsely populated directory structure. In such an embodiment, the structure of the directory may be periodically evaluated to determine if a sparsely populated structure would be more efficient with regard to search time, space utilization, or other measure of performance and/or efficiency. At such time, the data structure may be changed from fully populated to sparsely populated.

Figure 3:
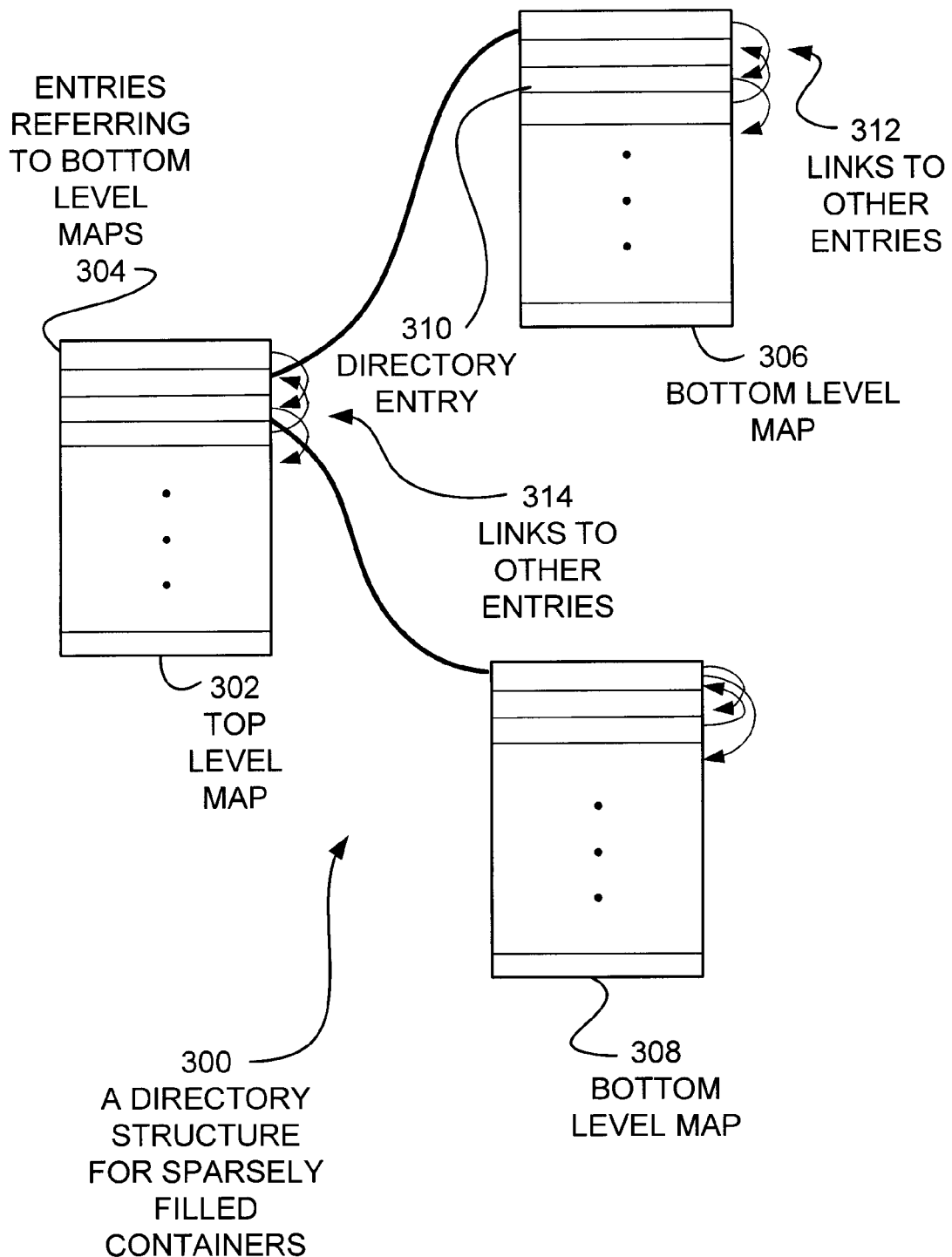
FIG. 3 is an illustration of an embodiment of the present invention of a directory structure for a sparsely filled data container.

FIG. 3 illustrates an embodiment 300 of the present invention of a directory structure for a sparsely filled data container. A top level map 302 may have several entries 304 that refer to the various bottom level maps 306 and 308. The bottom level map 306 may be constructed with links 312 to other entries as a linked list, doubly linked list, skip list, or other linked list data structure. Similarly, the top level map 302 may comprise links 314 and may be constructed in a form of a linked list data structure.

The directory structure 300 may include several directory entries 310. The entries 310 may include a description of the file to which it refers plus the location information for the file. Each entry 310 may also include one or more links or pointers to different entries.

The directory structure 300 may be searched by first searching the top level map 302. Each entry 304 in the top level map may indicate the approximate range of data contained in the various bottom level maps. When the appropriate bottom level map is located, the search may traverse through the linked list of the bottom level map until the appropriate entry is found.

The top level map 302 may be a sequential list or may be a linked list. In cases where the top level map 302 is a sequential list, the links 314 would not be necessary. In cases where the top level map 302 is a linked list, the various forms of linked lists may be used such as singly linked lists, doubly linked lists, skip lists, or other data structures as may be desired.

The data structure 300 is designed so that individual entries 310 do not need to be allocated for every available data block in the container. As one skilled in the art would appreciate, the data structure 300 would occupy only a minimal amount of memory and would return very fast results for small ratios of the number of entries 310 verses the number of allocated blocks of data for the storage container.

Figure 4:
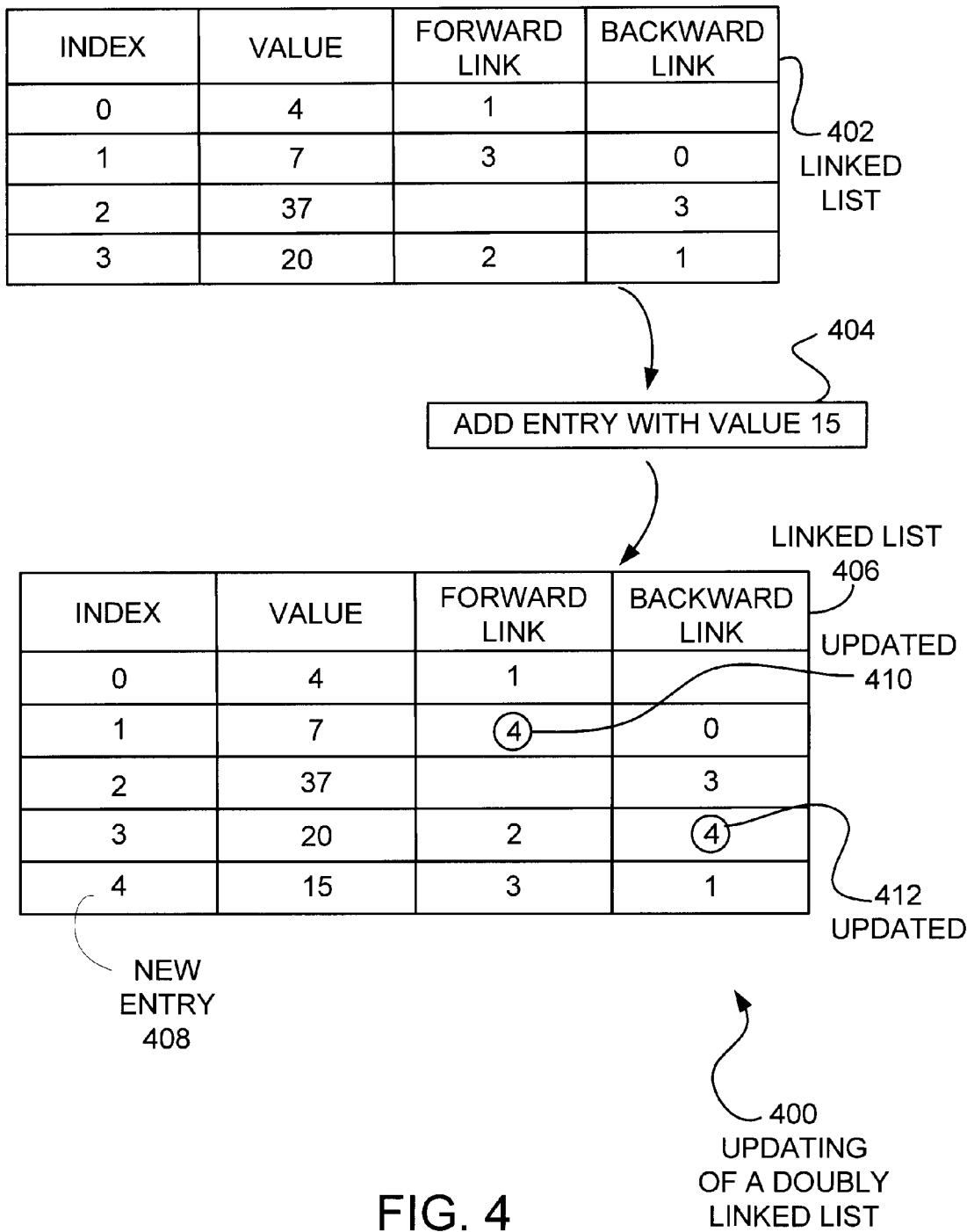
FIG. 4 is an illustration of a process for adding an entry to a doubly linked list.

FIG. 4 illustrates a process 400 for adding an entry to a doubly linked list. The first linked list 402 is shown as a table of entries along the rows with the columns of index, value, forward link, and backward link. A new entry with a value of 15 is to be added in block 404, producing the updated link list 406.

The index of list 402 is the entry number of the list. The index may be used as a reference for the various links.

The value of list 402 is the value for which a search is being performed. In the case of a linked list being used as a directory structure, the value may be the address within the data container.

In order to traverse the list in a forward manner, the forward links are used. For example, beginning with index 0, the forward link points to index 1, then to index 3, then to index 2. By following the forward index of each item, the list may be traversed in an ordered manner.

Similarly, in order to traverse the list in a backward manner, the backward links are used. For example, beginning with index 2, the backward link points to index 3, then to index 1, then to 0.

When the entry 408 is added to the linked list 406, the forward link 410 and the backward link 412 may be updated. In this manner, entries may be added to the list and are made searchable by updating one or two links.

Figure 5:
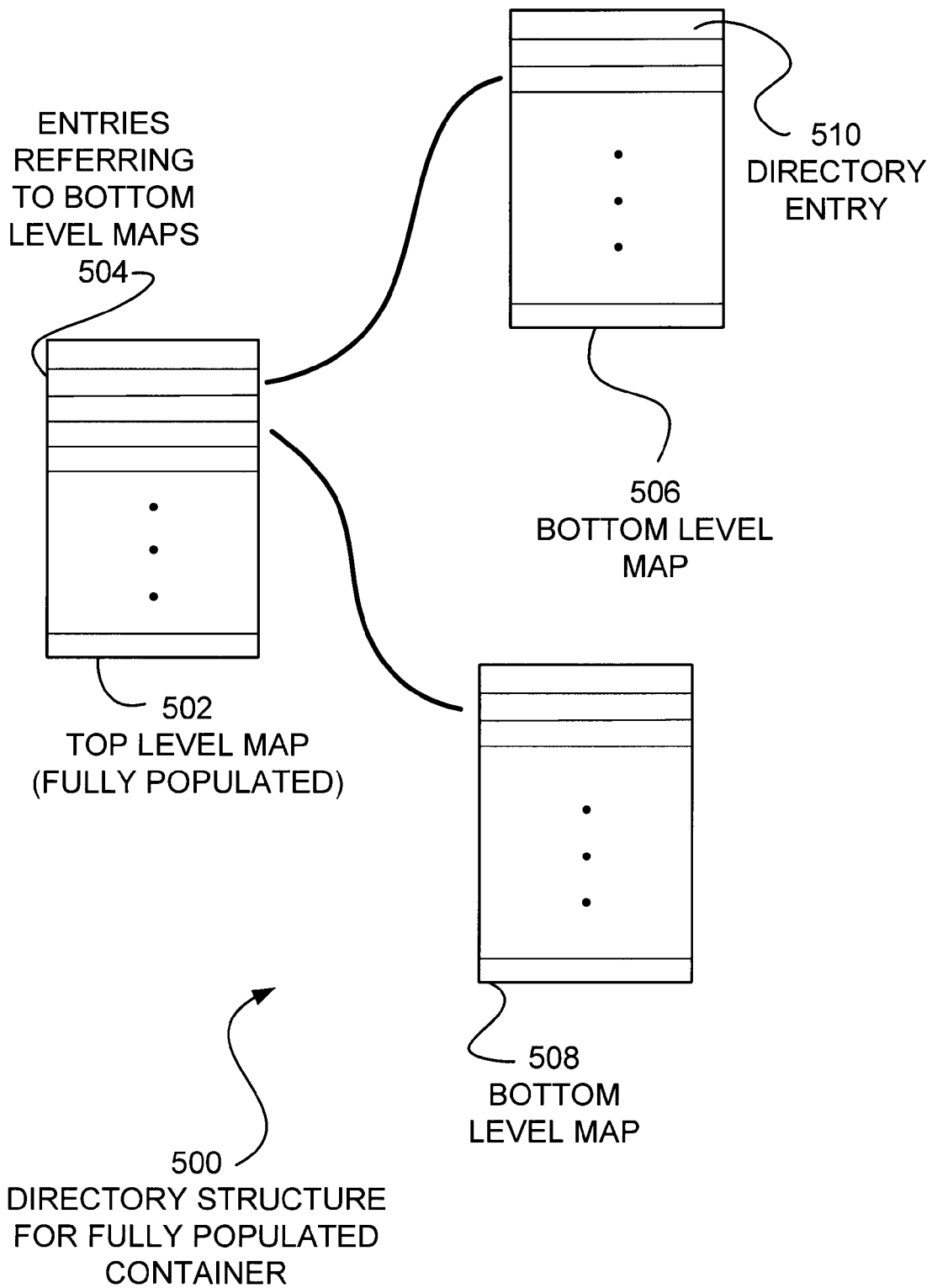
FIG. 5 is an illustration of an embodiment of the present invention of a directory structure that may be suited for a fully populated container.

FIG. 5 illustrates an embodiment 500 of a directory structure that may be suited for a fully populated container. A top level map 502 contains entries 504 that refer to the various bottom level maps 506 and 508. For every independently addressable data space within the data container, there is a directory entry 510 in a bottom level map.

The embodiment 500, when used for a fully populated container, would be configured with a directory entry 510 for every addressable space of the container. Each entry 510 may not need to have links or addresses associated with them, since the embodiment 500 may be arranged so that the entry's position in the structure can be interpreted as the address.

The embodiment 500 may be searched by first sequentially searching the top level map 502 for the range of the appropriate bottom level map. When the appropriate range is determined, the sequential search will continue with the specific bottom level map until the location is found.

Preferably, the entire contents of the directory may be kept in random access memory of a controller. It would be an inefficient use of memory to use a data structure such as embodiment 500 for a directory wherein only a small portion of the directory entries are populated. Thus, the directory may be initially constructed with a searchable linked list type of sparse directory structure for those situations where such a directory is suitable. The directory structure may be changed and adapted to a fully populated directory structure when the performance of the sparse directory structure becomes less efficient than a fully populated directory structure.

An embodiment of the present invention may therefore comprise a method of maintaining a directory for a data container comprising: creating a sparse directory structure for the data container; determining that the sparse directory structure is to be changed; and reconstructing the sparse directory structure into a fully populated directory structure.

Another embodiment of the present invention may comprise a method of creating a directory for a sparsely filled data container comprising: defining a data container; creating a first directory entry comprising a first address, and a first forward link; creating a second directory entry comprising a second address, and a second forward link; determining that the second directory entry is located after the first directory entry in the data container; defining the first forward link to link to the second directory entry; creating a bottom level list that comprises the first directory entry and the second directory entry; creating a top level entry that comprises a link to the bottom level list, a lower range, and an upper range; analyzing the bottom level list to determine the lower range and the upper range of the top level entry; and creating a top level directory that comprises the top level entry.

Yet another embodiment of the present invention may comprise a data storage system comprising: a data storage container; and a controller that defines a sparse directory structure for the data container, determines that the sparse directory structure is to be changed, and reconstructs the sparse directory structure into a fully populated directory structure.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of maintaining a directory for a data container comprising:
    determining that a sparse directory structure is to be changed, wherein the sparse directory has an entry for each addressable data stored in the container but not an entry for each addressable storage location in the container; and
    reconstructing said sparse directory structure into a fully populated directory structure having an entry for each addressable data storage location in the container.

2. The method of claim 1 further comprising:
    determining that said fully populated directory structure is to be changed; and
    reconstructing said fully populated directory structure into a sparsely populated directory structure.

3. The method of claim 1 wherein said sparse directory structure comprises:
    a plurality of first directory entries comprising an address to one of said addressable spaces, a descriptor, and at least one link, said link being a pointer to a different of said directory entries;

at least one bottom level list comprising at least one of said plurality of first directory entries;

at least one top level entry for each of said bottom level lists; and a top level list comprising said top level entries.

4. The method of claim 3 wherein said top level list is a skip list.

5. The method of claim 3 wherein said top level list is a linked list.

6. The method of claim 3 wherein said top level list is an ordered array.

7. The method of claim 3 wherein said bottom level lists are skip lists.

8. The method of claim 3 wherein said bottom level lists are linked lists.

9. The method of claim 1, wherein the sparse directory structure of the determining step is formed by steps comprising:

creating a first directory entry comprising a first address, and a first forward link;

creating a second directory entry comprising a second address, and a second forward link;

determining that said second directory entry is located after said first directory entry in said data container;

defining said first forward link to link to said second directory entry;

creating a bottom level list that comprises said first directory entry and said second directory entry;

creating a top level entry that comprises a link to said bottom level list, a lower range, and an upper range;

analyzing said bottom level list to determine said lower range and said upper range of said top level entry; and creating a top level directory that comprises said top level entry.

10. The method of claim 9 wherein said first directory entry comprises a first backward link and said second directory comprises a second backward link, the method further comprising:

determining that said first directory entry is located before said second directory entry in said data container; and defining said second backward link to link to said first directory entry.

11. The method of claim 9 further comprising:

creating a third directory entry comprising a third address, and a third forward link, said third address being between said first directory entry and said second directory entry; and adding said third directory entry by steps comprising:

adding said third directory entry to said bottom level list;

determining that said third directory entry is located between said first directory entry and said second directory entry; and changing said first forward link to link to said third directory entry; and defining said third forward link to link to said second directory entry.

12. A data storage system comprising:

a data storage container; and a controller that defines a sparse directory structure for said data container having an entry for each addressable data stored in the container but not an entry for each addressable storage location in the container, determines that said sparse directory structure is to be changed, and reconstructs said sparse directory structure into a fully populated directory structure having an entry for each addressable data storage location in the container.

13. The data storage system of claim 12 wherein said sparse directory structure comprises:

a plurality of first directory entries comprising an address to one of said addressable spaces, a descriptor, and at least one link, said link being a pointer to a different of said directory entries;

at least one bottom level list comprising at least one of said plurality of first directory entries;

at least one top level entry for each of said bottom level lists; and a top level list comprising said top level entries.

14. The data storage system of claim 13 wherein said bottom level list is a skip list.

15. The data storage system of claim 13 wherein said bottom level list is a linked list.

16. The data storage system of claim 13 wherein said bottom level list is an ordered array.

17. The data storage system of claim 13 wherein said top level list is a skip list.

18. The data storage system of claim 13 wherein said top level list is a linked list.

19. The data storage system of claim 13 wherein said top level list is an ordered array.

20. A data storage system comprising a controller configured for selectively constructing either a variable size sparse directory structure for a data container or a fixed size fully populated directory structure for the same data container, wherein the sparse directory has an entry for each addressable data stored in the container but not an entry for each addressable data storage location in the container, and the fully populated directory structure has an entry for each addressable data storage location in the container.

21. The data storage system of claim 20 wherein the controller is configured for selectively reconstructing a previously constructed sparse directory structure into a fully populated directory structure.

22. The data storage system of claim 20 wherein the controller is configured for selectively reconstructing a previously constructed fully populated directory structure into a sparse directory structure.

* * * * *